US011745261B2

(12) United States Patent
Ishimine et al.

(10) Patent No.: US 11,745,261 B2
(45) Date of Patent: Sep. 5, 2023

(54) SINTERED GEAR

(71) Applicants: Sumitomo Electric Industries, Ltd., Osaka (JP); Sumitomo Electric Sintered Alloy, Ltd., Takahashi (JP)

(72) Inventors: Tomoyuki Ishimine, Osaka (JP); Shigeki Egashira, Osaka (JP); Kazunari Shimauchi, Osaka (JP); Takayuki Tashiro, Osaka (JP)

(73) Assignees: SUMITOMO ELECTRIC INDUSTRIES, LTD., Osaka (JP); SUMITOMO ELECTRIC SINTERED ALLOY, LTD., Takahashi (JP)

( * ) Notice: Subject to any disclaimer, the term of this patent is extended or adjusted under 35 U.S.C. 154(b) by 10 days.

(21) Appl. No.: 17/638,200

(22) PCT Filed: Aug. 30, 2019

(86) PCT No.: PCT/JP2019/034297

§ 371 (c)(1),
(2) Date: Feb. 25, 2022

(87) PCT Pub. No.: WO2021/038879

PCT Pub. Date: Mar. 4, 2021

(65) Prior Publication Data

US 2022/0299097 A1 Sep. 22, 2022

(51) Int. Cl.

*B22F 5/08* (2006.01)
*B22F 3/16* (2006.01)
*F16H 55/06* (2006.01)
*F16H 55/17* (2006.01)
*B22F 1/00* (2022.01)

(52) U.S. Cl.

CPC .................. *B22F 5/08* (2013.01); *B22F 1/00* (2013.01); *B22F 3/162* (2013.01); *F16H 55/06* (2013.01); *F16H 55/17* (2013.01); *B22F 2301/35* (2013.01)

(58) Field of Classification Search

CPC ........ B22F 5/08; B22F 3/162; B22F 2301/35; F16H 55/06; F16H 57/0431

See application file for complete search history.

(56) References Cited

U.S. PATENT DOCUMENTS

2018/0236548 A1 8/2018 Ishimine et al.
2020/0208244 A1 7/2020 Egashira et al.
2022/0281000 A1* 9/2022 Ishimine ................ C22C 38/12

FOREIGN PATENT DOCUMENTS

CN 112112945 A * 12/2020 ............ F16H 55/17
JP 2004-155223 A 6/2004
JP 2012-96251 A 5/2012
JP 2016-5855 A 1/2016
JP 2017-186625 A 10/2017
JP 2019-19362 A 2/2019
WO 2017/175772 A1 10/2017
WO 2019/021935 A1 1/2019

* cited by examiner

*Primary Examiner* — Terence Boes
(74) *Attorney, Agent, or Firm* — XSENSUS LLP

(57) ABSTRACT

A sintered gear of annular shape which has a composition including a metal, has a plurality of pores in a surface thereof, and has a relative density of 93% or more and 99.5% or less.

11 Claims, 3 Drawing Sheets

SINTERED GEAR

CROSS-REFERENCE TO RELATED APPLICATION

The present application is based on PCT/JP2019/034297 filed on Aug. 30, 2019, the entire contents of which is incorporated herein by reference.

TECHNICAL FIELD

The present disclosure relates to a sintered gear.

BACKGROUND ART

PTL 1 discloses an iron-based sintered body having a relative density of 93% or more.

CITATION LIST

Patent Literature

PTL 1: Japanese Patent Laying-Open No. 2017-186625

SUMMARY OF INVENTION

A sintered gear of the present disclosure is a sintered gear of annular shape, the sintered gear having a composition including a metal, wherein the sintered gear has a plurality of pores in a surface thereof, and the sintered gear has a relative density of 93% or more and 99.5% or less.

DETAILED DESCRIPTION

Figure 1A:
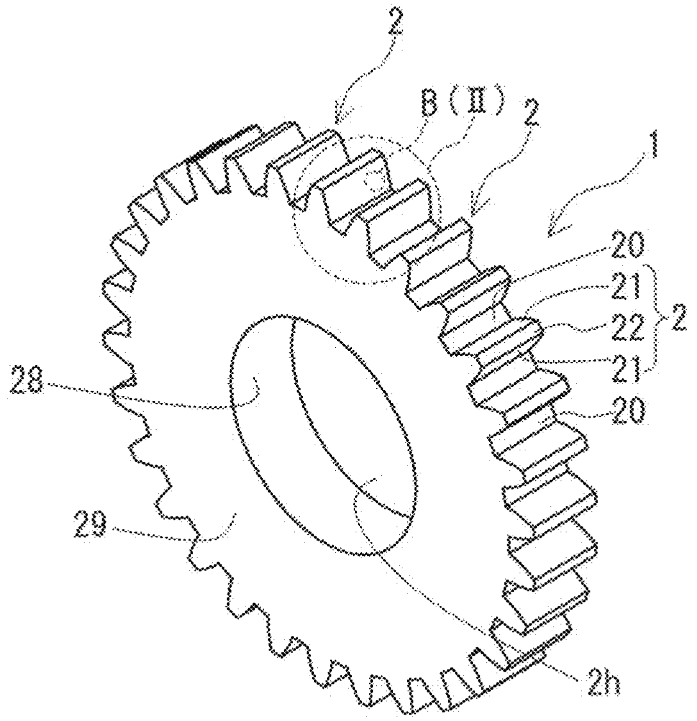
FIG. 1A is a perspective view of an example sintered gear of an embodiment.

Problem to be Solved by the Present Disclosure

It is desired to improve productivity of a gear made of a sintered body.

An object of the present disclosure is therefore to provide a sintered gear that achieves excellent productivity.

Advantageous Effect of the Present Disclosure

The sintered gear of the present disclosure achieves excellent productivity.

DESCRIPTION OF EMBODIMENTS

First, embodiments of the present invention are listed and described.

(1) A sintered gear according to an aspect of the present disclosure is a sintered gear of annular shape, the sintered gear having a composition including a metal, wherein the sintered gear has a plurality of pores in a surface thereof, and the sintered gear has a relative density of 93% or more and 99.5% or less.

The sintered gear of the present disclosure achieves excellent productivity for the following reasons (A) to (D).

(A) In a manufacturing process, a machining time for cutting, such as gear cutting, is likely to be short.

In the sintered gear of the present disclosure, the cutting is performed on a pressed powder body before sintering, not on a sintered material after sintering. The pressed powder body is more excellent in cutting machinability than a cast material or the like, and accordingly, is more likely to lead to a shorter cutting time. In particular, gear cutting with a hob cutter, not with a machining center, is more likely to reduce a machining time.

(B) The pressed powder body is resistant to chipping during the cutting described above, and accordingly, is likely to have a higher yield.

When a workpiece is a pressed powder body, the shape of the pressed powder body can be made simple. Thus, a closely-packed pressed powder body having a relative density of, for example, 93% or more can be easily obtained. When the pressed powder body is closely packed, it is resistant to chipping during cutting.

(C) A sintering temperature can be low, and accordingly, thermal energy can be reduced.

When the pressed powder body is closely packed, a closely-packed sintered gear having a relative density of 93% or more can be obtained even if the sintering temperature is low.

(D) When the sintering temperature is low, a sintered gear excellent in accuracy of form and accuracy of dimension can be easily obtained. In this respect, a higher yield can be easily obtained.

Further, the pores present in the surface of the sintered gear of the present disclosure can retain a lubricant. The lubricant retained in the pores reduces scoring between the sintered gear of the present disclosure and the mating gear. The sintered gear of the present disclosure has excellent durability. Also, the sintered gear of the present disclosure is closely packed, and accordingly, has an excellent strength. In these respects, the sintered gear of the present disclosure can be used favorably for a long term.

(2) In an embodiment of the sintered gear of the present disclosure, the metal is an iron-based alloy.

The iron-based alloy commonly has a high strength. Thus, the above-mentioned embodiment has an excellent strength.

(3) In an embodiment of the sintered gear of the present disclosure, the sintered gear has a periodic concave and convex shape at a tooth bottom thereof.

The recesses at the tooth bottom in the above embodiment can retain a lubricant. In the above embodiment, thus, scoring between the sintered gear and the mating gear can be reduced also by the lubricant retained in the recesses. For example, the periodic concave and convex shape is typically formed by gear cutting with a hob cutter. The use of the hob cutter is more likely to reduce a machining time than when a machining center is used.

(4) In an embodiment of the sintered gear of (3) above, a periodicity of the concave and convex shape has a length of 1 mm or more.

The periodicity of the concave and convex shape in the above embodiment typically has a size corresponding to a feed of the hob cutter. When the length of the periodicity is 1 mm or more, it can be said that the feed of the hob cutter is large. When the feed is large, a machining time for gear cutting is likely to be short. When the length of the periodicity is as large as 1 mm or more, the tooth bottom is likely to avoid local stress concentration due to the concaves and convexes. In this respect, the above example achieves an excellent strength.

(5) In one embodiment of the sintered gear of the present disclosure, the sintered gear has, at a tooth root thereof, a level difference with a portion having a locally small thickness in a tooth thickness direction.

A lower-level portion of the level difference at the tooth root in the above embodiment can retain the lubricant. Thus, the above embodiment can reduce scoring between the sintered gear and the mating gear also by the lubricant retained in the level difference. The level difference is typically formed by finishing a tooth surface with a protuberance cutting tool. The embodiment in which the tooth surface is subjected to finishing allows the sintered gear to favorably mate with the mating gear.

(6) In an embodiment of the sintered gear of the present disclosure, the sintered gear has a lathe mark on an outer circumferential surface of a tooth tip thereof.

In the above embodiment, the outer circumferential surface of the tooth tip has minute concaves and convexes based on the lathe mark. The recesses of the minute concaves and convexes can retain the lubricant. The above embodiment can thus reduce scoring between the sintered gear and the mating gear also by the lubricant retained in the recesses. For example, the lathe mark is typically formed by lathing the outer circumferential surface of the pressed powder body before gear cutting. In this case, gear cutting can be performed with high accuracy, and accordingly, a higher yield can be easily obtained.

(7) In an embodiment of the sintered gear of the present disclosure, the sintered gear has a lathe mark on at least one of two end surfaces located at ends in an axial direction of the sintered gear.

In the above embodiment, for example, a lathe mark is typically formed by lathing the end surface of the pressed powder body before gear cutting. In this case, gear cutting can be performed with high accuracy, and accordingly, a higher yield can be easily obtained.

(8) In an embodiment of the sintered gear of (2) above, the iron-based alloy includes one or more elements selected from the group consisting of C, Ni, Mo, and B.

The iron-based alloy including one or more of the elements listed above, for example, steel, which is an iron-based alloy including C, has an excellent strength. The above embodiment thus achieves an excellent strength.

DETAILS OF EMBODIMENT OF THE PRESENT DISCLOSURE

A sintered body according to an embodiment of the present disclosure will now be described specifically with reference to the drawings as appropriate, in which the same reference characters designate the same components.

[Sintered Gear]

A sintered gear 1 according to an embodiment will be described with reference to FIGS. 1 to 5 as appropriate.

(Summary)

A sintered gear 1 of the embodiment is a gear made of a sintered material mainly including a metal. Sintered gear 1 is an annular body with a through-hole 2*h* and includes teeth 2 on an outer circumference thereof. Each tooth 2 includes tooth surfaces 21 and a tooth tip 22. A tooth bottom 20 is provided between adjacent teeth 2. Tooth bottom 20 forms a bottom of a tooth groove defined by adjacent teeth 2. Tooth tip 22 defines a region on the tip side of tooth 2. Tooth surface 21 is a surface connecting tooth bottom 20 to tooth tip 22. Typically, tooth bottom 20 and tooth tip 22 rotate coaxially with the axis of sintered gear 1. The axis of sintered gear 1 is typically the axis of through-hole 2*h*. The basic shape of sintered gear 1 may be a known gear shape.

Typically, an inner circumferential surface 28 defining through-hole 2*h* is provided to be cylindrical. Typically, at least part of two end surfaces 29 located at the ends in an axial direction of sintered gear 1 is provided to be planar. Although FIG. 1A illustrates the case where the entire end surface 29 is formed of a uniformly flat surface, the shape on the end surface 29 side can be changed as appropriate. In one example, sintered gear 1 has a partially varying thickness, and end surface 29 has a smaller thickness in the region on the inner circumferential side than in the region on the outer circumferential side. In this case, the shape on the end surface 29 side is the shape of a level difference varying in the axial direction. Through-hole 2*h* passes through the both end surfaces 29.

Although FIG. 1A illustrates a spur gear with external teeth, the gear shape can be changed as appropriate. Examples of the gear shape include a helical gear shape, a bevel gear shape, and a screw gear shape. Sintered gear 1 may have external teeth or internal teeth. Although FIG. 1A illustrates the case where tooth surface 21 is a flat surface, it may be an involute curved surface.

Sintered gear 1 of the embodiment has a composition including a metal.

Figure 1B:
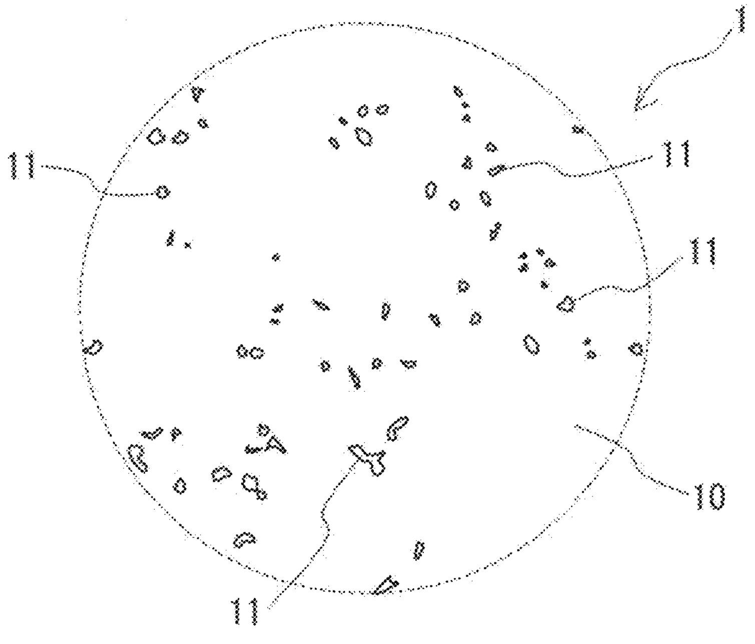
FIG. 1B is a partially enlarged view showing a portion within a dotted circle B in the sintered gear shown in FIG. 1.

Sintered gear 1 has a relative density of 93% or more and 99.5% or less. Sintered gear 1 of the embodiment has a plurality of pores 11 in the surface of sintered gear 1 (FIG. 1B). Typically, in the surface of sintered gear 1, pores 11 are distributed over a matrix phase 10 made of a metal.

More detailed description will be given below.

(Composition)

Examples of the metal of sintered gear 1 of the embodiment include various pure metals or alloys. Examples of the pure metals include iron, nickel, titanium, copper, aluminum, and magnesium. The examples of the alloys include an iron-based alloy, a titanium-based alloy, a copper-based alloy, an aluminum-based alloy, and a magnesium-based alloy. An alloy commonly has a higher strength than that of a pure metal. Sintered gear 1 having a composition including an alloy thus has an excellent strength. In particular, the iron-based alloy commonly has a high strength. Sintered gear 1 including matrix phase 10 made of the iron-based alloy thus has a more excellent strength.

The iron-based alloy includes an additional element, and the rest of the iron-based alloy includes Fe (iron) and impurities. The iron-based alloy is an alloy in which the content of Fe is the highest. Examples of the additional element include one or more elements selected from the group consisting of C (carbon), Ni (nickel), Mo (molybdenum), and B (boron). An iron-based alloy including the above-listed elements in addition to Fe, for example, steel has an excellent strength, for example, has a high tensile strength. Sintered gear 1 including matrix phase 10 made of the iron-based alloy including the above additional element thus has an excellent strength. A higher content of each element is likely to lead to a higher strength. As long as the content of each element is not excessively high, a decrease in toughness and embrittlement are restrained, and accordingly, toughness is likely to become higher.

An iron-based alloy including C, typically, carbon steel, has an excellent strength. For example, the content of C is 0.1 mass % or more and 2.0 mass % or less. The content of C may be 0.1 mass % or more and 1.5 mass % or less, further, 0.1 mass % or more and 1.0 mass % or less, 0.1 mass % or more and 0.8 mass % or less. The content of each element is a mass percentage with the content of the iron-based alloy be taken as 100 mass %.

Ni contributes to improvement in strength, as well as improvement in toughness. For example, the content of Ni is 0 mass % or more and 5.0 mass % or less. The content of Ni is 0.1 mass % or more and 5.0 mass % or less, further, 0.5 mass % or more and 5.0 mass % or less, further, 4.0 mass % or more and 3.0 mass % or less.

Mo, B contribute to improvement in strength. In particular, Mo is likely to lead to a higher strength.

For example, the content of Mo is 0 mass % or more and 2.0 mass % or less, further, 0.1 mass % or more and 2.0 mass % or less, further, 1.5 mass % or less.

For example, the content of B is 0 mass % or more and 0.1 mass % or less, further, 0.001 mass % or more and 0.003 mass % or less.

Examples of the other additional elements include Mn (manganese), Cr (chromium), Si (silicon), and the like. For example, the content of each of these elements is 0.1 mass % or more and 5.0 mass % or less.

The overall composition of sintered gear 1 may be analyzed by, for example, an energy dispersive X-ray analysis (EDX or EDS) method, a high frequency inductively coupled plasma optical emission spectrometry (ICP-OES) method, or any other method.

(Structure)

<Surface Structure>

Pores 11 are present in the surface of sintered gear 1 of the embodiment (FIG. 1B). Herein, the relative density of sintered gear 1 is 93% or more and 99.5% or less, and accordingly, the content of pores 11 is 0.5% or more and 7% or less. When the content falls within this range, it can be said that pores 11 are few though sintered gear 1 includes pores 11. Also, some of pores 11 are present in the surface of sintered gear 1, and the other pores 11 are present inside sintered gear 1. It can thus be said that the total area of pores 11 present in the surface of sintered gear 1 is somewhat small. Further, each pore 11 is small in sintered gear 1 of the embodiment, as will be described below. Since pores 11 are few and each pore 11 is small, pore 11 is less likely to be a starting point of cracking. Sintered gear 1 as described above has an excellent strength. In particular, pores 11 present in the surface can retain a lubricant. This lubricant allows sintered gear 1 of the embodiment to reduce scoring between sintered gear 1 and a mating gear and has excellent durability. This lubricant improves the slidability of tooth surface 21. In this respect, durability and heat-transfer efficiency improve.

An example method of manufacturing a closely-packed sintered gear 1 that has pores 11 on a surface thereof and has a relative density of 93% or more is the following manufacturing method. This manufacturing method involves cutting a closely-packed pressed powder body having a relative density of 93% or more by gear cutting or the like, and then, sintering the pressed powder body. This manufacturing method will be referred to as a high-density molding method. The high-density molding method will be described below in detail. The high-density molding method can manufacture sintered gear 1 of the embodiment with high productivity, as will be described below.

<Internal Structure>

In an example embodiment of sintered gear 1 of the embodiment, sintered gear 1 includes pores 11, and each pore 11 is small in any cross section.

<<Sectional Area>>

For example, in any cross section of sintered gear 1, pores 11 have an average sectional area of 500 $\mu m^2$ or less. Herein, the average sectional area of pores 11 is a value obtained by obtaining any cross section from sintered gear 1, determining a sectional area of each pore 11 of pores 11 in this cross section, and averaging the determined sectional areas. The methods of measuring a sectional area of pore 11, a circumferential length, a maximum diameter, a relative density, and the like of pore 11, which will be described below, will be described below.

When the average sectional area is 500 $\mu m^2$ or less, it can be said that many pores 11 of sintered gear 1 are pores 11 with a small sectional area. It can be said that the sectional area of each pore 11 is smaller as the average sectional area is smaller. When each pore 11 is small, it is less likely to be a starting point of cracking. In this respect, sintered gear 1 has an excellent strength. In terms of reducing the occurrence of cracking due to pore 11, the average sectional area is preferably 480 $\mu m^2$ or less, further, 450 $\mu m^2$ or less, particularly, 430 $\mu m^2$ or less.

In contrast, when the average sectional area is, for example, 20 $\mu m^2$ or more, further, 30 $\mu m^2$ or more, a closely-packed pressed powder body can be obtained without excessively increasing a molding pressure. In this respect, productivity is increased.

<<Circumferential Length>>

For example, the average circumferential length of pores 11 is 100 μm or less in any cross section of sintered gear 1. Herein, the average circumferential length of pores 11 is a value determined by obtaining any cross section from sintered gear 1, determining the length of the contour of each pore 11 of pores 11 in this cross section, and averaging the determined lengths of the contours.

When the average circumferential length is 100 μm or less, it can be said that many pores 11 of sintered gear 1 are pores 11 having a small circumferential length. Pore 11 with a small circumferential length has a small sectional area. It can be said that the sectional area of each pore 11 is smaller as the average circumferential length is smaller. When each pore 11 is small, it is less likely to be a starting point of cracking. In terms of reducing the occurrence of cracking due to pore 11, the average circumferential length is preferably 90 μm or less, further, 80 μm or less, particularly, 70 μm or less.

In terms of improving productivity by preventing a molding pressure from becoming excessively high as described above, the average circumferential length may be, for example, 10 μm or more, further, 15 μm or more.

When the average sectional area of pores 11 is 500 $\mu m^2$ or less and the average circumferential length of pore 11 is 100 μm or less, each pore 11 is less likely to be a starting point of cracking, which is more preferable.

<<Maximum Diameter>>

Preferably, the maximum diameter of pores 11 has a small average value in any cross section of sintered gear 1. Herein, the average value of the maximum diameters of pores 11 is a value determined by obtaining any cross section from sintered gear 1, determining the maximum diameter of each pore 11 of pores 11 in this cross section, and averaging the determined maximum diameters.

For example, the average value of the maximum diameter of pore 11 is 5 μm or more and 30 μm or less. When the average value satisfies the above range, each pore 11 is less likely to be a starting point of cracking, and besides, a molding pressure can be prevented from becoming excessively high. In terms of reducing the occurrence of cracking due to pore 11, the average value is preferably 28 μm or less, further, 25 μm or less, particularly, 20 μm or less. In terms of improving productivity by preventing a molding pressure from becoming excessively high, the average value may be 8 μm or more, further, 10 μm or more. In terms of the balance between high strength and good productivity, for example, the average value is 10 μm or more and 25 μm or less.

Further, when the maximum value of the maximum diameters of pores 11 is also small, each pore 11 is less likely to be a starting point of cracking, which is preferable. The maximum value is, for example, 30 μm or less, further, 28 μm or less, particularly, 25 μm or less.

The minimum value of the maximum diameter of pore 11 which is 3 μm or more and 20 μm or less, further, 5 μm or more and 18 μm or less is preferable in terms of improving productivity as described above.

<<Shape>>

In a cross section of sintered gear 1, the shape of pore 11 is not a simple linear shape such as a circular shape or an oval shape, and is typically a deformed shape.

(Relative Density)

The relative density of sintered gear 1 of the embodiment is 93% or more and 99.5% or less. As the relative density is higher, pores 11 are fewer. Pore 11 is thus less likely to be a starting point of cracking, and sintered gear 1 has an excellent strength. For example, sintered gear 1 has a sufficiently high strength required for a gear used in a transmission. In terms of reducing the occurrence of cracking due to pore 11, the relative density is preferably 94% or more, further, 95% or more, 96% or more, particularly, 96.5% or more. The relative density may be 97% or more, 98% or more, 99% or more.

When the relative density of sintered gear 1 is 99.5% or less, a molding pressure can be prevented from becoming excessively high, leading to improved productivity. In terms of improving productivity, the relative density may be 99% or less.

In terms of the balance between high strength and good productivity, the relative density of sintered gear 1 is, for example, 94% or more and 99% or less.

(Shape)

Figure 2:
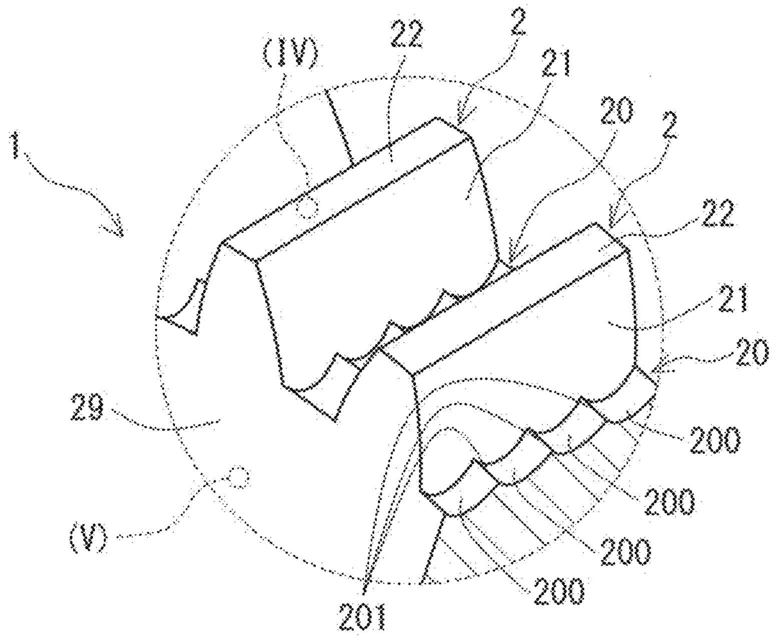
FIG. 2 is a partial perspective view showing a portion within the dotted circle (II) in the sintered gear shown in FIG. 1.
Figure 3:
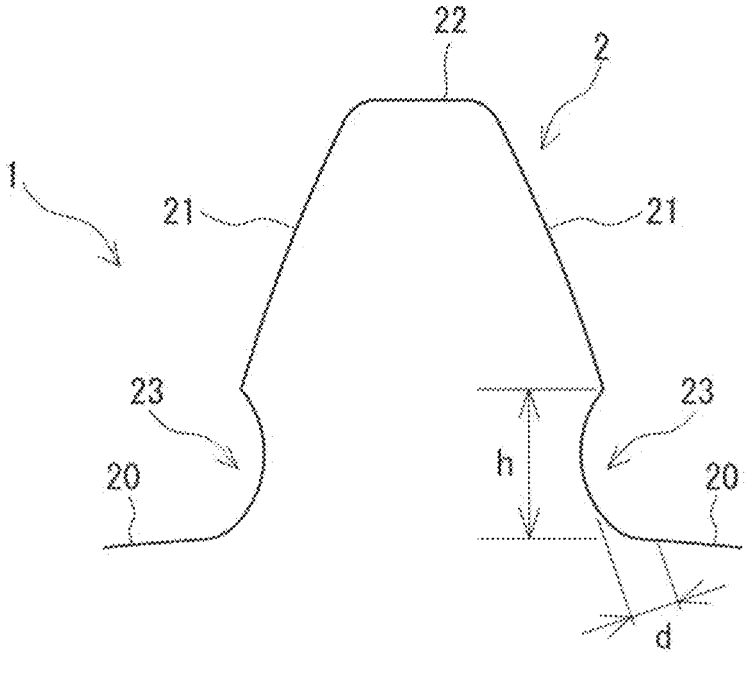
FIG. 3 is an enlarged plan view showing one tooth in the sintered gear of the embodiment.

An example of sintered gear 1 of the embodiment has a periodic concave and convex shape at tooth bottom 20 as shown in FIG. 2. Herein, the periodic concave and convex shape refers to a shape in which a plurality of curved surfaces having substantially the same shape and size are contiguous. A portion of connection between curved surfaces is the highest portion, that is, a projection 201. A recess 200 is located between adjacent projections 201. Projections 201 of tooth bottom 20 are arranged at prescribed intervals from one end surface 29 side to the other end surface 29 side of sintered gear 1. When tooth bottom 20 is not a flat surface but has the periodic concave and convex shape as described above, recesses 200 at tooth bottom 20 can retain the lubricant. In addition to pores 11 in the surface, the lubricant retained in recesses 200 allows sintered gear 1 to reduce scoring between sintered gear 1 and the mating gear, in particular, a tooth tip.

FIG. 2 shows two teeth 2 of teeth 2 included in sintered gear 1 in an enlarged manner. FIG. 2 also shows a partial cross section of one tooth bottom 20. This cross section shows tooth bottom 20 cut in a plane parallel to the axial direction of through-hole 2*h*. FIG. 2 shows concaves and convexes in an exaggerated manner for easy understanding. The number of each of projections 201 and recesses 200 of the concaves and convexes in FIG. 2 is merely an example.

For example, the periodic concave and convex shape described above is typically formed by gear cutting with a hob cutter. In this case, a cutting mark formed with the hob cutter corresponds to the periodic concave and convex shape. Gear cutting with the hob cutter more easily reduces a machining time than when a machining center is used, as will be described below. In this respect, sintered gear 1 achieves excellent productivity.

The length of the periodicity of the concave and convex shape described above is, for example, 1 mm or more. The length of the periodicity refers to a distance in the axial direction of sintered gear 1 and is also a distance between adjacent projections 201. When the periodic concave and convex shape is based on gear cutting with a hob cutter described above, the periodicity of the concave and convex shape has a size corresponding to a feed of the hob cutter. When the length of the periodicity is 1 mm or more, for example, it can be said that a feed (mm/rotation) of the hob cutter is larger than a feed in gear cutting of a cast material with the hob cutter. When the feed of the hob cutter is larger, a machining time for gear cutting is more likely to be short. Also, when the length of the periodicity is as long as 1 mm, tooth bottom 20 can more easily avoid local stress concentration due to concaves and convexes more easily than when the length of the periodicity is less than 1 mm. Thus, tooth bottom 20 is resistant to cracking. In this respect, sintered gear 1 has an excellent strength.

It can be said that the feed of the hob cutter is larger as the periodicity is longer. When the workpiece is a pressed powder body before sintering, a larger amount of feed of the hob cutter can be easily secured. This is because the pressed powder body is excellent in cutting machinability than a cast material and a sintered material. In particular, when the pressed powder body is closely packed as described above, it is resistant to chipping during cutting. Thus, subjecting a closely-packed pressed powder body to gear cutting with a hob cutter contributes to improvement in productivity. When the length of the periodicity is longer, tooth bottom 20 can reduce portions at which a stress concentrates locally. In this respect, the strength of sintered gear 1 is more likely to improve. In terms of improving productivity and improving strength, the length of the periodicity may be 1.5 mm or more, further, 2.0 mm or more, 2.5 mm or more, 3.0 mm or more.

In one example of sintered gear 1 of the embodiment, the tooth root has a level difference 23 with a portion having a locally small thickness in the tooth thickness direction. The tooth thickness direction refers to the horizontal direction of the plane of paper in FIG. 3. The tooth root refers to a corner between tooth bottom 20 and a virtual surface obtained by extending tooth surface 21 toward tooth bottom 20. In the tooth root, a portion recessed from tooth surface 21 inwardly in the tooth thickness direction is a lower-level portion of level difference 23. Tooth surface 21 is a higher-level portion of level difference 23. The lower-level portion of level difference 23 can retain the lubricant. In addition to pores 11 in the surface, the lubricant retained in level difference 23 allows sintered gear 1 to reduce scoring between sintered body 1 and the mating gear.

A depth d of level difference 23 is, for example, 0.1 μm or more and 500 μm or less. When depth d falls within the above range, a reduction in the strength of tooth 2, which is due to level difference 23, is likely to decrease while allowing level difference 23 to retain the lubricant. Methods of measuring depth d of level difference 23 and a length h of level difference 23, described below, will be described below.

Length h of level difference 23 is, for example, 10 μm or more and 100 μm or less. When length h falls within the above range, tooth surface 21 is provided suitably while allowing level difference 23 to retain the lubricant.

For example, level difference 23 is typically formed by finishing tooth surface 21 with a protuberance cutting tool. Sintered gear 1 with tooth surface 21 subjected to finishing can favorably mate with the mating gear to rotate stably. Depth d and a length h of level difference 23 described above may be adjusted in accordance with the size of the protuberance, cutting conditions, or the like.

An example of sintered gear 1 of the embodiment has a lathe mark on the outer circumferential surface of tooth tip 22. Herein, the lathe mark refers to concaves and convexes having an arithmetic mean roughness Ra that satisfies the range of 0.1 μm or more to 500 μm or less, and has a periodic concave and convex shape. The details of the concave and convex shape are as described above. In other words, the lathe mark corresponds to minute concaves and convexes with a plurality of projections arranged at intervals of 500 μm or less.

Figure 4:
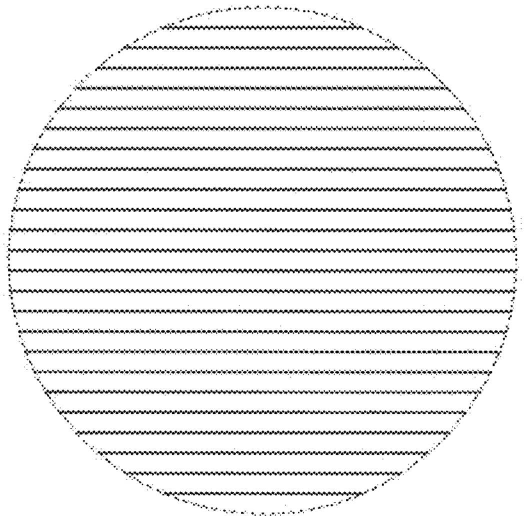
FIG. 4 is an enlarged partial plan view showing a portion within the dotted circle (IV) in the sintered gear shown in FIG. 2.

As the outer circumferential surface of tooth tip 22 with the lathe mark is viewed from the direction orthogonal to the axial direction of sintered gear 1 in plan view, a plurality of linear streaks are arranged at prescribed intervals as illustrated in FIG. 4. The streaks are typically parallel in the direction orthogonal to the axial direction of sintered gear 1. These linear streaks are arranged while being adjacent to each other in the axial direction of sintered gear 1. The horizontal direction of the plane of paper in FIG. 4 corresponds to the circumferential direction of sintered gear 1. The vertical direction of the plane of paper in FIG. 4 corresponds to the axial direction of sintered gear 1. Each streak forms a projection of the concaves and convexes. A recess is located between adjacent projections.

As tooth tip 22 has minute concaves and convexes on the outer circumferential surface based on the lathe mark, the recesses of the concaves and convexes can retain the lubricant. In other words, at tooth tip 22 at which the sintered gear mates with the mating gear, the recesses of the minute concaves and convexes as well as pores 11 in the surface retain the lubricant. When a pressed powder body shaped into a gear by compression is sintered and is not subjected to gear cutting, lathing is not performed as well. Thus, a gear is obtained that has no lathe mark at the tooth tip. Compared with a gear having no lathe mark at the tooth tip, sintered gear 1 having a lathe mark at tooth tip 22 can effectively reduce scoring between sintered body 1 and the mating gear, in particular, tooth bottom 20 by the lubricant retained at tooth tip 22 described above.

For example, the lathe mark described above is typically formed by lathing the outer circumferential surface of the pressed powder body before machining the tooth tip. In other words, the tooth tip is machined after the lathing. In this case, part of the machined surface subjected to lathing remains after gear cutting and forms the outer circumferential surface of tooth tip 22. When the outer circumferential surface of the pressed powder body before gear cutting is lathed, gear cutting can be performed with high accuracy as will be described below, and accordingly, sintered gear 1 achieves excellent productivity.

Figure 5:
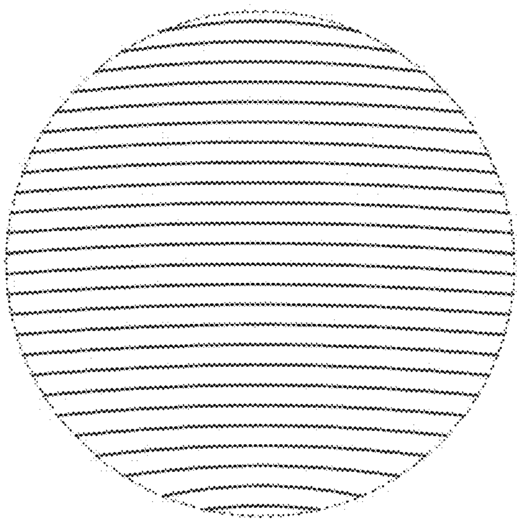
FIG. 5 is an enlarged partial plan view showing a portion within the dotted circle (V) in the sintered gear shown in FIG. 2.

An example of sintered gear 1 of the embodiment has a lathe mark on at least one end surface 29 of two end surfaces 29. As end surface 29 having the lathe mark is viewed from the axial direction of sintered gear 1 in plan view, a plurality of circular streaks are arranged concentrically at prescribed intervals with the central axis of through-hole 2*h* (FIG. 1A) as the center, as illustrated in FIG. 5. Each streak forms a projection of the minute concaves and convexes described above.

For example, the lathe mark of end surface 29 is typically formed by lathing the end surface of the pressed powder body before machining the tooth tip. In other words, the tooth tip is machined after the lathing. In this case, a machined surface subjected to lathing remains after gear cutting, and finally, forms end surface 29 of sintered gear 1. When the end surface of the pressed powder body is lathed before gear cutting, gear cutting can be performed with high accuracy as will be described below, and accordingly, sintered gear 1 achieves excellent productivity. In terms of improving machining accuracy of gear cutting, the both end surfaces 29 preferably have a lathe mark.

In addition, sintered gear 1 may have a lathe mark on at least a part of inner circumferential surface 28. The circular streaks extending in the circumferential direction of inner circumferential surface 28 are typically arranged at prescribed intervals in the axial direction of sintered gear 1. Each streak forms a projection of the minute concaves and convexes forming a lathe mark. For example, the lathe mark of inner circumferential surface 28 is typically formed by lathing for providing a through-hole in a pressed powder body before machining of tooth tip. In other words, the tooth tip is machined after the lathing. In this case, a machined surface subjected to lathing remains after gear cutting, and finally, forms inner circumferential surface 28 of sintered gear 1. When a through-hole is formed in a pressed powder body before gear cutting, gear cutting can be performed with high accuracy as will be described below, and accordingly, sintered gear 1 achieves excellent productivity.

(Measuring Method)

The size of pore 11 of sintered gear 1 is determined as will be described below. Any cross section is obtained in sintered gear 1. The cross section is observed under a scanning electron microscope (SEM), and at least one field of view is obtained from the cross section. The size of a pore is measured by extracting 50 or more pores in total.

A magnification is adjusted in accordance with the size of the pore such that one or more pores are located in one field of view and the size of the pore can be measured with high accuracy. For example, the following operation is performed: the cross section is observed at a 100-fold magnification, and when the maximum diameter of the pore is 70 μm or less, the magnification is changed to a 300-fold magnification and the cross section is observed again. The number of fields of view is increased until 50 or more pores can be obtained in total.

In the fields of view, pores are extracted. The pores are extracted by performing binarization on a SEM image. The extraction of pores, the measurement of the pore size, the extraction of a region made of a metal, which is used in measurement of relative density, described below, the measurement of an area of the region, or the like can be easily performed using a commercially available image analysis system, commercially available software, or the like.

<Sectional Area>

A sectional area of each pore extracted from the above-mentioned SEM image is determined. Further, an average value of a sectional area of the pore is determined. The average value of the sectional area is determined by calculating a sum total of sectional areas of 50 or more extracted pores and dividing the sum total by the number of pores. The average value of the sectional area is an average sectional area ($\mu m^2$).

<Circumferential Length>

A circumferential length of each pore extracted from the above-mentioned SEM image, that is, the length of a contour thereof is determined. Further, an average value of the circumferential length of the pore is determined. The average value of the circumferential length is determined by calculating a sum total of the circumference lengths of 50 or more extracted pores and dividing the sum total by the number of pores. The average value of the circumferential length is an average circumferential length (μm).

<Maximum Diameter>

A maximum diameter of each pore extracted from the above-mentioned SEM image is determined. Further, an average value of the maximum diameter is determined. The average value (μm) of the maximum diameter is determined by calculating a sum total of the maximum diameters of 50 or more extracted pores and dividing the sum total by the number of pores. The maximum diameter of each pore is determined as follows. In the above-mentioned SEM image, an outline of each pore is sandwiched by two parallel lines, and an interval between the two parallel lines is measured. The interval is a distance in the direction orthogonal to the parallel lines. In each pore, a plurality of sets of parallel lines in any direction are obtained, and the interval is measured for each of the sets. In each pore, a maximum value of the plurality of measured intervals is the maximum diameter of each pore.

Among the maximum diameters of the 50 or more pores described above, a maximum value and a minimum value are a maximum value (μm) and a minimum value (μm) of the maximum diameter, respectively.

<Relative Density>

A relative density (%) of sintered gear 1 is determined as follows.

A plurality of cross sections are obtained from sintered gear 1. Each cross section is observed under a microscope such as a SEM or an optical microscope. This observation image is subjected to image analysis, and a ratio of the area of a metal component is regarded as a relative density.

Specifically, a cross section is obtained from the region on the end surface 29 side in sintered gear 1 and a region near the center of the length in the axial direction in sintered gear 1.

The region on the end surface 29 side is, for example, a region within the range of 3 mm or less inwardly from the surface of sintered gear 1 though it depends on the length of sintered gear 1. The region near the center is, for example, a region within 1 mm from the center of the length toward the either end surface side, that is, a region within 2 mm in total, though it depends on the length of sintered gear 1. The cross section is, for example, a flat surface crossing the axial direction, typically a flat surface orthogonal to the axial direction.

A plurality of, for example, 10 or more observation fields of view are obtained from each cross section. For example, the area of one observation field of view is 500 $\mu m \times 600 \mu m = 300{,}000 \mu m^2$. When a plurality of observation fields of view are obtained from one cross section, preferably, this cross section is evenly divided, and an observation field of view is obtained from each divided region.

An observation image of each observation field of view is subjected to image processing such as binarization, and a region made of a metal is extracted from a processed image. An area of the extracted region made of a metal is determined. Further, a ratio of the area of the region made of a metal to an area of the observation field of view is determined. This ratio of the area is regarded as a relative density of each observation field of view. The relative densities of the obtained plurality of, for example, 30 or more observation fields of view in total are averaged. The obtained average value is a relative density (%) of sintered gear 1.

The relative density of the pressed powder body may be determined similarly to the relative density of sintered gear 1. When the pressed powder body is molded by uniaxial pressing, for example, a cross section of the pressed powder body is obtained from each of the region near the center of the length in the pressurization axis direction in the pressed powder body and the region on the end surface side located at either end in the pressurization axis direction. A cross section is, for example, a flat surface crossing the pressurization axis direction, typically orthogonal to the pressurization axis direction.

<Depth, Length of Level Difference of Tooth Root>

The size of level difference 23 of the tooth root of sintered gear 1 is determined as follows.

With a flat surface orthogonal to the axial direction of sintered gear 1, that is, a flat surface parallel to end surface 29 being taken as a section, a cross section of tooth 2 is obtained. The section is observed under a microscope such as a SEM or an optical microscope. This observation image is subjected to image analysis, thereby extracting a perimeter of tooth 2.

On the extracted perimeter of tooth 2, a portion of the tooth root which is locally recessed from tooth surface 21 inwardly in the tooth thickness direction, here, a lower-level portion of level difference 23, is extracted. A maximum distance is determined that extends from a virtual surface obtained by extending tooth surface 21 toward tooth bottom 20 and the lower-level portion of level difference 23. This maximum distance is depth d of level difference 23.

On the extracted perimeter of tooth 2, a distance from tooth bottom 20 to the lower edge of tooth surface 21 is determined in the diameter direction of a circumcircle of sintered gear 1. This distance is length h of level difference 23. The diameter direction is the vertical direction of the plane of paper in FIG. 3.

<Lathe Mark>

A lathe mark is determined by measuring an arithmetic mean roughness Ra in accordance with JIS B 0601 (2001). In the measurement, a commercially available surface roughness measurement apparatus, for example, SURFCOM 1400D-3DF available from Mitutoyo Corporation can be used.

(Use)

Sintered gear 1 of the embodiment can be used for a power transmission component. In particular, sintered gear 1 of the embodiment is closely packed and has an excellent strength, and besides, can be miniaturized. Thus, sintered gear 1 of the embodiment is preferably used for a gear which is desired to have a high strength, a smaller size, and a lighter weight, for example, for a transmission of a vehicle.

(Main Effects)

Sintered gear 1 of the embodiment has a high relative density and is closely packed, and also has pores 11 in a surface thereof. Sintered gear 1 as described above can be manufactured by a high-density molding method, which will be described below, and accordingly achieves excellent productivity. In particular, sintered gear 1 of the embodiment can reduce scoring between sintered gear 1 and the mating gear by the lubricant retained in pores 11 in the surface, and accordingly, has excellent durability. Further, sintered gear 1, which is closely packed, has an excellent strength. Sintered gear 1 as described above can be used favorably for a long term.

[Method of Manufacturing Sintered Gear]

For example, sintered gear 1 of the embodiment is manufactured by a method of manufacturing a sintered gear which includes the following steps, that is, a high-density molding method.

(First Step) A raw powder is compressed, thereby producing a pressed powder body having a relative density of 93% or more and 99.5% or less.

(Second Step) The pressed powder body is subjected to cutting which includes gear cutting.

(Third Step) The pressed powder body is sintered. A sintering temperature is lower than a liquidus temperature.

The use of a closely-packed pressed powder body having a relative density of 93% or more leads to a closely-packed sintered material having a relative density of 93% or more and 99.5% or less even when the sintering temperature is a relatively low temperature lower than the liquidus temperature. This is because the sintered material described above typically maintains the relative density of the pressed powder body. The pressed powder body described above also has pores in the range of 0.5% or more and 7% or less. Note that each pore has a smaller size due to compression. Also, each pore present in the surface is small. As a closely-packed pressed powder body having small pores is sintered at the relatively low temperature as described above, air bubbles tend to remain without being removed. Each pore, however, remains small. Thus, a closely-packed sintered gear 1 having small pores is obtained. In particular, the high-density molding method can manufacture sintered gear 1 of the embodiment with high productivity, as will be described below.

(A) A machining time for cutting, such as gear cutting, is short.

A pressed powder body before sintering is more excellent in cutting machinability than a cast material or a sintered material. Thus, when cutting such as gear cutting is performed on a pressed powder body, a larger feed can be obtained than when gear cutting is performed on, for example, a cast material or a sintered material. A closely-packed pressed powder body is resistant to cracking even when its feed is set to be large, and accordingly, can be cut favorably. As the feed is larger, a machining time for gear cutting is shorter. In particular, gear cutting with a hob cutter achieves a larger feed more easily or allows setting of a workpiece more easily than when a machining center is used. Consequently, gear cutting with a hob cutter, not with a machining center, is more likely to reduce a machining time.

(B) A pressed powder body can be obtained more easily.

When the workpiece is a pressed powder body, the pressed powder body may be a compact of simple shape, such as a cylindrical body or a cylindrical column body. With the simple shape, a closely-packed pressed powder body is likely to be molded with high accuracy. A pressed powder body, which is closely packed, is resistant to chipping during cutting and is likely to have a higher yield. Also, the simple shape enables molding of a pressed powder body without an excessively high molding pressure, and accordingly, is likely to lead to a longer life of a mold. Further, the simple shape leads to a reduction in the cost of the mold.

(C) A sintering temperature can be low, leading to a reduction in thermal energy.

(D) A sintering temperature can be low, and accordingly, the accuracy of form and the accuracy of dimension are less likely to reduce. Thus, a sintered gear excellent in accuracy of form and excellent accuracy of dimension due to thermal contraction can be easily obtained, and a yield is likely to become high.

Herein, example methods of manufacturing a gear made of a metal are as follows.

(1) Gear cutting is performed on a cast material.

(2) A pressed powder body molded into a gear shape by compression is sintered.

(3) A pressed powder body is sintered, and is then forged.

The manufacturing methods (2), (3) do not involve gear cutting.

A gear obtained by the method (1) above has a relative density of 100% and has substantially no pores in a surface thereof. For this reason, it is not desired that the pores retain a lubricant as described above.

A gear obtained by the method (2) above has a relative density of less than 93%, normally, a relative density as low as less than 90%. This gear accordingly has a poor strength due to the presence of an excessively large number of pores, though the gear has pores in a surface thereof and within the gear. This gear and a gear obtained by the method (3) have substantially no concaves and convexes based on the feed or minute concaves and convexes based on a lathe mark. For this reason, it is not desired that the recesses retain a lubricant as described above. Further, this gear leads to poor accuracy of dimension.

The gear obtained by the method (3) above has a relative density of 100% and has substantially no pores in a surface thereof. For this reason, it is not desired that the recesses retain a lubricant as described above or the lubricant be retained by the recesses as described above. Further, this gear leads to poor accuracy of dimension.

It can thus be said that a sintered gear having pores in a surface thereof and a relative density being 93% or more and 99.5% or less can be used as one of the indications that a sintered gear has been manufactured by the high-density molding method. It can also be said that a sintered gear having small pores in any cross section can be used as one of the indications.

Description will be given below for each step.

(First Step)

<Preparation of Raw Powders>

Raw powders include a metal powder. The metal powder is preferably made of a metal that is not excessively soft and is not excessively hard. The metal powder, which is not excessively hard, is more likely to experience plastic deformation by compression. Thus, a closely-packed pressed powder body having a relative density of 93% or more can be easily obtained. As the metal powder is not excessively soft, a pressed powder body having a relative density of 99.5% or less, that is, a pressed powder body with pores can be easily obtained.

The raw powders may include a metal powder having an appropriate composition in accordance with the composition of the matrix phase of a sintered material. The hardness of the metal powder may be adjusted in accordance with the composition of the metal powder. Examples of the adjustment of the hardness of the metal powder include adjustment of the composition, heat treatment of the metal powder, and adjustment of heat treatment conditions of the metal powder.

Regarding the composition of the metal powder, see the section (Composition) of [Sintered Gear].

For example, in the manufacture of a sintered gear including a matrix phase made of an iron-based material, the raw powders include an iron-based powder. The iron-based material is pure iron or an iron-based alloy. In particular, when the iron-based material is an iron-based alloy, a sintered gear having a high strength as described above can be obtained. The iron-based powder can be produced by, for example, a water atomization method, a gas atomization method, or any other method.

When a sintered gear including a matrix phase made of an iron-based alloy is manufactured, the raw powders are as follows.

(1) The raw powders include a first alloy powder made of an iron-based alloy. The iron-based alloy of the first alloy powder has the same composition as that of the iron-based alloy of the matrix phase of the sintered gear.

(2) The raw powders include a second alloy powder made of an iron-based alloy and a third powder made of a prescribed element. The iron-based alloy of the second alloy powder includes some additional elements of the additional elements included in the iron-based alloy of the matrix phase of the sintered gear. Each element of the third powder is made of a corresponding one of the remaining additional elements of the additional elements described above. In other words, the third powder is made of an element alone.

(3) The raw powders include a pure iron powder, and the second alloy powder and the third powder described above.

(4) The raw powders include a pure iron powder and a third powder. In this case, the third powder is made of the additional elements of the iron-based alloy of the matrix phase.

For example, when the matrix phase of the sintered gear is an iron-based alloy including one or more elements selected from the group consisting of Ni, Mo, and B and includes C and the rest is made of Fe and impurities, for example, the second alloy powder is made of an iron-based alloy described below. The iron-based alloy does not include C and includes one or more elements selected from the above group, and the rest is made of Fe and impurities. An example of the iron-based alloy includes at least one element of 0.1 mass % or more and 2.0 mass % or less of Mo and 0.5 mass % or more and 5.0 mass % or less of Ni. Examples of the third powder include a carbon powder and a powder made of one element selected from the group described above.

In particular, a Vickers hardness Hv of an iron-based material is, for example, 80 or more and 200 or less. A powder made of an iron material having a Vickers hardness Hv of 80 or more is not excessively soft. The use of raw powders including such an iron-based powder leads to a pressed powder body having pores in a specific range as described above. A powder made of an iron-based material having a Vickers hardness Hv of 200 or less is not excessively hard. The use of raw materials including such an iron-based powder leads to a closely-packed pressed powder body as described above. Vickers hardness Hv may be 90 or more and 190 or less, further, 100 or more and 180 or less, 110 or more and 150 or less. Iron-based alloys including Mo or Ni in the above-mentioned range have various compositions including a Vickers hardness Hv of 80 or more and 200 or less.

The size of the raw powder can be selected as appropriate. An average grain size of the alloy powder or pure iron powder described above is, for example, 20 μm or more and 200 μm or less, further, 50 μm or more and 150 μm or less. An average grain size of the third powder except for a carbon powder is, for example, 1 μm or more and 200 μm or less. An example average grain size of the carbon particle is 1 μm or more and 30 μm or less. Herein, the average grain size of the powder is a grain size (D50) with which an accumulated volume in a volume grain size distribution, measured by a laser diffraction grain size distribution measuring apparatus, is 50%.

<Molding>

As the relative density of the pressed powder body is higher, the finally obtained sintered material is likely to have a higher relative density and fewer pores. Also, the pores in the sintered material tend to become smaller. In terms of reducing pores and reducing the size of each pore, the relative density of the pressed powder body may be 94% or more, further, 95% or more, 96% or more, 96.5% or more, 97% or more, 98% or more.

In contrast, when the pressed powder body has a relative density which is somewhat low, the molding pressure may be low. Thus, in terms of easily increasing the life of the mold and in terms of easily extracting a pressed powder body from a mold to reduce a time for demolding, mass productivity is enhanced. In terms of good mass productivity, the relative density of the pressed powder body is 99.4% or less, further, 99.2% or less.

In the manufacture of a pressed powder body, for example, a press machine with a mold capable of uniaxial pressing is typically used. The shape of the mold may be selected in accordance with the shape of the pressed powder body. The shape of the pressed powder body may be a simple shape, such as a cylindrical body or a cylindrical column body as described above, differently from the final shape of the sintered material.

A lubricant may be applied to the inner circumferential surface of the mold. With the lubricant, seizing of a raw powder to a mold can be easily restrained. As a result, a pressed powder body can be obtained more easily that is excellent in accuracy of form and accuracy of dimension and is closely packed. Examples of the lubricant include a higher fatty acid, metallic soap, fatty acid amide, and higher fatty acid amid.

As the molding pressure is higher, a closely-packed pressed powder body is obtained more easily. The molding pressure is, for example, 1560 MPa or more. Further, the molding pressure may be 1660 MPa or more, 1760 MPa or more, 1860 MPa or more, 1960 MPa or more.

(Second Step: Cutting)

Cutting includes at least gear cutting. In particular, gear cutting with a hob cutter leads to a shorter machining time as described above, which is preferable. Cutting may be turning or milling.

It is preferable that, before gear cutting, cutting be performed on at least one portion selected from the group consisting of the outer circumferential surface of the pressed powder body, the inner circumferential surface of the through-hole, and the end surface of the pressed powder body. A machined surface subjected to the cutting is excellent in accuracy of form and accuracy of dimension. Thus, a workpiece after cutting can be positioned with high accuracy. As a result, gear cutting can be performed with high accuracy, thereby achieving a gear cutting product excellent in accuracy of dimension and accuracy of form. Eventually, a sintered gear excellent in accuracy of dimension and accuracy of form is obtained. Thus, a yield is likely to become high. It is preferable that cutting be performed on all of the above three portions.

Cutting before gear cutting as described above may be turning such as lathing. When the outer circumferential surface of the pressed powder body is lathed, at least a part of the outer circumferential surface of the tooth tip of the sintered gear has a lathe mark (see FIG. 4). When a through-hole is provided in the pressed powder body, at least a part of the inner circumferential surface of the sintered gear has a lathe mark. When the end surface of the pressed powder body is lathed, at least a part of the end surface of the sintered gear has a lathe mark (see FIG. 5).

(Third Step: Sintering)

A sintering temperature and a sintering time may be adjusted in accordance with the composition of the raw powder or the like. When an iron-based powder is used, sintering temperature is, for example, 1000° C. or higher and 1300° C. or lower. As the sintering temperature is lower, a thermal contraction amount is likely to be smaller. Thus, a sintered material excellent in accuracy of form and accuracy of dimension can be easily obtained. In terms of reduced energy and improved accuracy of form and accuracy of dimension, the sintering temperature is preferably 1250° C. or lower, preferably, lower than 1200° C. When the sintering temperature is 1050° C. or higher, further, 1100° C. or higher, the sintering time is likely to be shorter. In terms of the balance between reduced energy and good accuracy, and a reduced sintering time, the sintering temperature is, for example, 1100° C. or higher and lower than 1200° C. The sintering time is, for example, 10 minutes or more and 150 minutes or less.

Examples of the atmosphere during sintering include a nitrogen atmosphere and a vacuum atmosphere. A pressure in the vacuum atmosphere is, for example, 10 Pa or less. In the nitrogen atmosphere or the vacuum atmosphere, the oxygen content in atmosphere is low, and accordingly, a pressed powder body and a sintered material are resistant to oxidation.

(Other Steps)

When the iron-based powder described above is used, the high-density molding method may include the step of performing heat treatment on the sintered material produced in the third step. For example, when the iron-based powder described above is used, the heat treatment may be, for example, carburizing, hardening, and tempering, or carburizing hardening and tempering. The conditions of the heat treatment may be adjusted as appropriate in accordance with the composition of the sintered material. Regarding the conditions of the heat treatment, known conditions may be referred to.

The high-density molding method may include the step of finishing the sintered material produced in the third step. An example of the above finishing is finishing of the tooth surface described above. When the tooth surface is finished with a protuberance cutting tool, the sintered gear has the above-mentioned level difference at the tooth root (see FIG. 3). Any other example of the finishing is grinding.

It should be noted that the present invention is defined by the terms of the claims, rather than being limited to these examples, and is intended to include any modifications within the scope and meaning equivalent to the terms of the claims.

REFERENCE SIGNS LIST

1 sintered gear; 10 matrix phase; 11 pore; 2 tooth; **2*h* through-hole; 20 tooth bottom; 21 tooth surface; 22 tooth tip; 23 level difference; 28 inner circumferential surface; 29 end surface; 200 recess; 201** projection.

The invention claimed is:

1. A sintered gear of annular shape, the sintered gear having a composition including a metal, wherein the sintered gear has a plurality of pores in a surface thereof, the sintered gear has a relative density of 93% or more and 99.5% or less, the sintered gear has a periodic concave and convex shape for containing a lubricant at a tooth bottom thereof, and a periodicity of the concave and convex shape has a length of 1 mm or more.

2. The sintered gear according to claim 1, wherein the metal is an iron-based alloy.

3. The sintered gear according to claim 1, wherein the sintered gear has, at a tooth root thereof, a portion recessed from a tooth surface inwardly in a tooth thickness direction.

4. The sintered gear according to claim 1, wherein the sintered gear has a lathe mark on an outer circumferential surface of a tooth tip thereof.

5. The sintered gear according to claim 1, wherein the sintered gear has a lathe mark on at least one of two end surfaces located at axial ends of the sintered gear.

6. The sintered gear according to claim 2, wherein the iron-based alloy includes one or more elements selected from the group consisting of C, Ni, Mo, Mn, and B.

7. The sintered gear according to claim 1, wherein an average sectional area of the pores in any cross section of the sintered gear is 500 $\mu m^2$ or less.

8. The sintered gear according to claim 1, wherein an average circumferential length of the pores in any cross section of the sintered gear is 100 μm or less.

9. The sintered gear according to claim 1, wherein an average value of maximum diameters of the pores in any cross section of the sintered gear is 5 μm or more and 30 μm or less.

10. The sintered gear according to claim 1, wherein a maximum value of a maximum diameter of the pore in any cross section of the sintered gear is 30 μm or less.

11. A method of manufacturing a sintered gear, the method comprising:

a first step of compressing a raw powder to produce a pressed powder body having a relative density of 93% or more and 99.5% or less;

a second step of subjecting the pressed powder body to cutting which includes gear cutting; and a third step of sintering the pressed powder body subjected to the cutting, wherein the gear cutting is performed with a hob cutter, and in the third step, a sintering temperature is a temperature lower than a liquidus temperature, wherein the sintered gear has a periodic concave and convex shape for containing a lubricant at a tooth bottom thereof, and a periodicity of the concave and convex shape has a length of 1 mm or more.

* * * * *